(12) United States Patent
Morris

(10) Patent No.: US 6,539,335 B1
(45) Date of Patent: Mar. 25, 2003

(54) DATA COLLECTION AND ANALYSIS AID

(76) Inventor: Bert W. Morris, 465 La Corso Cir., Walnut Creek, CA (US) 94598-2237

( * ) Notice: Subject to any disclaimer, the term of this patent is extended or adjusted under 35 U.S.C. 154(b) by 0 days.

(21) Appl. No.: 09/578,212

(22) Filed: May 24, 2000

Related U.S. Application Data (60) Provisional application No. 60/136,129, filed on May 26, 1999.

(51) Int. Cl.⁷ .............................................. G01R 11/48
(52) U.S. Cl. ........................................ 702/179; 73/863
(58) Field of Search ................................ 702/179, 187, 702/127; 73/863

(56) References Cited

U.S. PATENT DOCUMENTS

| | | |
|---|---|---|
| 4,128,893 A | 12/1978 | Johnson et al. |
| 4,340,808 A | 7/1982 | Donohoo |
| 4,864,592 A | 9/1989 | Lee |
| 4,879,651 A | 11/1989 | Little, Jr. |
| 5,153,826 A | 10/1992 | Johnson |
| 5,347,473 A | 9/1994 | Hallman et al. |
| 5,649,115 A | 7/1997 | Schrader et al. |
| 5,729,479 A | 3/1998 | Golan |
| 5,842,181 A | 11/1998 | Fanjoy |
| 5,890,128 A * | 3/1999 | Diaz et al. ................... 128/921 |
| 6,008,735 A * | 12/1999 | Chiloyan et al. ....... 340/825.22 |
| 6,104,334 A * | 8/2000 | Allport ................... 340/825.24 |
| 6,202,060 B1 * | 3/2001 | Tran ........................ 707/104.1 |
| 6,334,778 B1 * | 1/2002 | Brown ........................ 273/429 |

FOREIGN PATENT DOCUMENTS

JP 02159767 6/1990

* cited by examiner

Primary Examiner—Marc S. Hoff
Assistant Examiner—Edward Raymond (57) ABSTRACT

The present data collection and analysis aid is for collecting quantitative data in different categories and tabulating the results. It features counting, time sampling, and item sampling data collection techniques. It is comprised of a dedicated hardware device or software running on a programmable computer. In either embodiment, category name displays are provided for identifying the categories. Count buttons are provided for entering counts in the categories. Count displays are provided for displaying the cumulative category counts. In response to each press of a count button, the aid is arranged to increase a corresponding category count by one, and to increase a total count for all categories by one. The percentage of each category count relative to the total count is also displayed. The counts and percentages are updated on the displays with each press of the count buttons. A correction button is provided for reversing the count inputs in case of error. For time and item sampling studies, the aid is arranged to indicate the required sample size based on parameters entered by the user to give the desired accuracy of the results. For time sampling, it is also arranged to periodically alert the user with a signal as to when to make an observation and enter a count. The entered data and analysis results are saved in a non-volatile storage device during shutdown and restored at startup. A plurality of studies may be stored and conducted simultaneously.

7 Claims, 10 Drawing Sheets

Microfiche Appendix Included
(1 Microfiche, 28 Pages)

ITEM SAMPLING
PRESS A BUTTON TO
  RECORD A COUNT
F2 = PAUSE

F1 START   F2 STOP   F3 OTHER

− A B C

CORRECT  PRICE

| | | STUDY A | |
|---|---|---|---|
| | | NO. | % |
| ① | UNDER $5 | 10 | 9.6 |
| ② | $5 TO $10 | 48 | 46.2 |
| ③ | $10 TO $15 | 27 | 26.0 |
| ④ | OVER $15 | 19 | 18.3 |
| ⑤ | | 0 | 0 |
| ⑥ | | 0 | 0 |
| ⑦ | | 0 | 0 |
| ⑧ | | 0 | 0 |
| ⑨ | | 0 | 0 |
| ⑩ | | 0 | 0 |
| | TOTALS ▷ | 104 | 100.0 |
| | REQUIRED NO. OF SAMPLES ▷ | 375 | |

SAMPLE

DATA COLLECTION AND ANALYSIS AID

CROSS REFERENCE TO RELATED APPLICATIONS

I claim the benefit of provisional patent application No. 60/136,129; filed May 26, 1999.

MICROFICHE APPENDIX

A program listing is provided in a microfiche appendix of 1 sheet with 28 total frames.

BACKGROUND OF THE INVENTION

1. Field of the Invention

This invention relates generally to statistical data collection and analysis devices and methods.

2. Prior Art

Business decisions that are important should be based on some quantitative data. In practice however, many of these decisions are based on guesswork. As a result, many outcomes are less than they might have been. The reasons for this guesswork are that many decision-maker do not have training in quantitative analysis and/or they do not have the tools to help them collect and analyze data.

For example, a stack of sales receipts that contain important information about order sizes may number 10,000 pieces of paper. The only practical way of analyzing this much data is to use sampling. However, sampling is a complex technique that is most familiar to auditors and statisticians. There are no tools to simplify the collection, processing, and display of quantitative information for decision making by non-technical people.

OBJECTIVES OF THE INVENTION

Accordingly, the objectives of the present data collection and analysis aid are to:

- enable users to easily collect and analyze multiple categories of quantitative data;
- perform counting to determine the number of times each category is counted, and the percentage of each category count relative to the total count for all categories;
- perform time sampling to determine the number of times each category is counted during a study period, and the percentage of each category count relative to the total count for all categories, with the results being representative of the population being sampled within predictable limits of accuracy;
- alert the user to enter counts at intervals when performing time sampling;
- perform item sampling to determine the number of times each category is counted, and the percentage of each category count relative to the total count for all categories, with the results being representative of the population being sampled within predictable limits of accuracy;
- enable all three types of analyses in the same device;
- provide an easily understood and easy to use interface;
- preserve entered data and analysis results during shutdown; and
- restore stored data and results during startup.

Further objectives of the present invention will become apparent from a consideration of the drawings and ensuing description.

BRIEF SUMMARY OF THE INVENTION

The present data collection and analysis aid is for collecting and tabulating quantitative data in different categories using different methods, including counting, time sampling, and item sampling. It is comprised of a dedicated hardware device or software running on a programmable computer. In either embodiment, category name displays are provided for identifying the categories. Count buttons are provided for entering counts in the categories. Count displays are provided for displaying the cumulative category counts. In response to each press of a count button, the aid is arranged to increase a corresponding category count by one, and to increase a total count for all categories by one. The percentage of each cumulative category count relative to the total cumulative count is also displayed. The counts and percentages are updated on the displays with each press of the count buttons. A correction button is provided for reversing a count input in case of error. For time and item sampling studies, the aid is arranged to indicate the required sample size based on parameters entered by the user. For time sampling studies, it is also arranged to periodically alert the user with a signal to enter a count of the category that represents the activity taking place at the moment the signal is issued. The entered data and analysis results are saved in a non-volatile storage device during shutdown and restored at startup. A plurality of studies may be stored.

DRAWING REFERENCE NUMERALS

| | |
|---|---|
| 10. Hand-Held Housing | 11–20. Count Buttons |
| 21–30. Category Name Displays | 31–40. Cumulative Category Count Displays |
| 41–50. Category Percentage Displays | 51. Cumulative Total Count Display |
| 52. Total Percentage | 53. Required Samples Display |
| 54. Main Display Panel | 55–57. Function Buttons |
| 58. Help Display | 59. Correction Button |
| 60–62. Study Buttons | 63–65. Study Name Displays |
| 66. Signaling Device | 67. Lamp |
| 68. Speaker | 69. Processor |
| 70. Storage Device | 100–425. Flowchart Blocks |

DETAILED DESCRIPTION OF THE INVENTION

Figure 1:
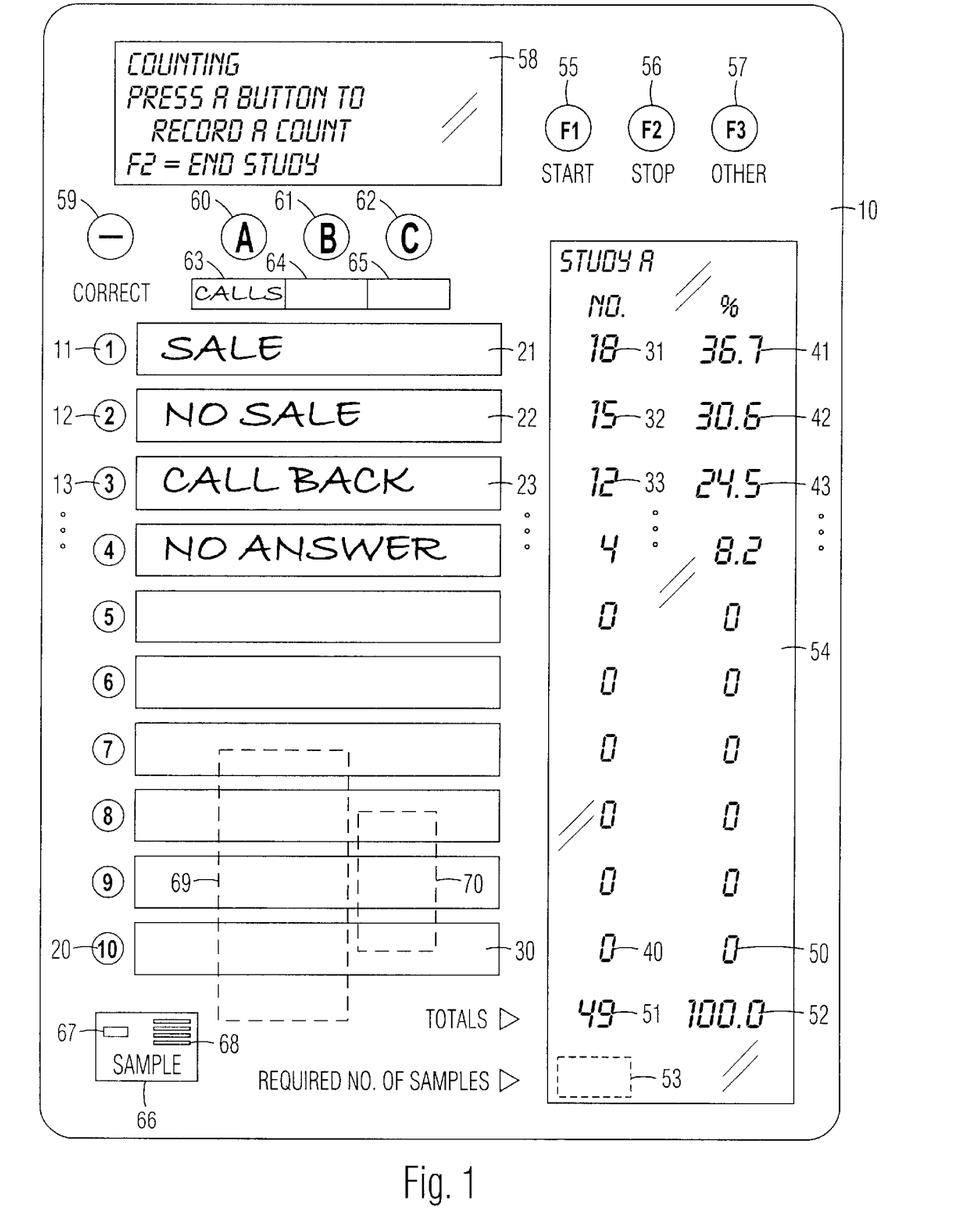
FIG. 1 is a front view of a preferred embodiment of the present data collection and analysis aid while performing counting.

FIG. 1:

A preferred embodiment of the present data collection and analysis aid is comprised of a hand-held housing 10 shown in FIG. 1. Count buttons 11–20 are arranged on housing 10 for entering counts of data, and are preferably labeled "1" through "10". More or fewer count buttons may be provided. Category name displays 21–30 are respectively aligned with count buttons 11–20 for displaying the names of different data categories. Category name displays 21–30 may be separate displays as shown, or they may be combined into a single display which show multiple lines of information. Category name displays 21–30 may comprise strips of paper detachably secured to housing 10, such as in slots, for receiving written category names. The writing can be erased to change the category names, or the strips of written paper can be replaced. A single large sheet of paper, or a permanent erasable pad can be provided instead. In the example shown, category name displays 21–30 are strips of paper or permanent erasable pads on which the category names are written with a pen or pencil. The category name displays may be combined with the count buttons, so that the category name displays are pressed or clicked to enter counts.

Adjacent category name displays 21–30 are category count displays 31–40 for displaying cumulative category counts, and category percentage displays 41–50 for displaying the percentage of each category count relative to a total count for all categories. A total count display 51 and a total percentage display 52 are respectively provided under category count displays 31–40 and category percentage displays 41–50. A required sample size display 53 is provided adjacent total count display 51. No required sample size is displayed when the counting function is selected. Displays 31–53 are preferably provided on a single main display panel 54 as shown. Each count button is horizontally aligned with and associated with a category name display, a category count display, and a category percentage display. The buttons and displays are thus arranged in tabular form or in a table to facilitate comprehension.

Function buttons 55–57 are arranged on housing 10. The labels shown on and under them are only exemplary; other labels may be provided. The functions of function buttons 55–57 may vary at different stages in the analysis process; their current functions are shown on a help display 58. A correction button 59 is provided for reversing an erroneous count input made through count buttons 11–20. Study buttons 60–62 are provided for storing and recalling different analysis sessions or studies. The labels shown on the study buttons are only exemplary. Study name displays 63–65 are respectively aligned with study buttons 60–62 to label them with meaningful names, such as "Calls" for telephone calls. Displays 63–65 may be strips of paper, erasable pads, or electronic displays.

A signaling device 66 is provided for signaling the user to take a sample when performing time sampling. Signaling device 66 is comprised of a lamp 67 and/or a speaker 68. Other types of signaling devices may be used, such as a vibrator (not shown). The signaling device, buttons, and electronic displays are connected to a processor 69. A data storage device 70 is also connected to processor 69 for storing data even when the aid is turned off, and for restoring the data on the displays upon restart so the user can easily resume work. Data storage device 70 may be solid state memory, a disk drive, a combination of solid state memory and disk drive, or any other suitable type of non-volatile memory.

In addition to the dedicated hardware device shown, the present data collection and analysis aid can also be implemented as software running in a programmable computer, such as a desktop computer, notebook computer, personal digital assistant (PDA), etc. When implemented as software running on a computer with a single display screen, the buttons may be keyboard keys, or they may be provided on screen as buttons or icons that are selectable with a pointer; and the displays, including the handwritten displays and the help display, may be implemented on the screen. The previously handwritten marks may be entered through the computer's character input system.

In any embodiment, the present invention is arranged to collect and tabulate counts of quantitative data, wherein all counts are entered manually. As an example, it is shown in FIG. 1 being used to count and analyze the results of telephone sales calls. When a function button for starting the counting of data is selected, the word "Counting" is displayed on help display 58. The results are divided into different categories, such as "Sale", "No Sale", "Call Back", and "No Answer". The categories are written by hand on category name displays 21–24. Step-by-step instructions are given to the user via help display 58. Commands are given by pressing function buttons 55–57. Counts are entered by category by pressing count buttons 11–20. Errors are corrected by first pressing correction button 59 and then the count button 11–20 that was entered in error. Help display 58 shown in FIG. 1 corresponds to flowchart block 203 in FIG. 5. After selecting to make a count study and entering the category names, the user is instructed to press count buttons 11–20 to enter counts by category. When the study is finished, the user is instructed to press function key "F2" or button 56 to end the study.

The number of calls that resulted in successful sales is entered by pressing count button 11 or "1" once for each call. As an example, 18 calls resulted in sales, so count button 11 is pressed 18 times. Each time count button 11 is pressed, corresponding category count display 31 is incremented by one, starting with zero or a blank display. Counts are similarly entered for the other categories. As the counts are entered, total count display 51 is updated with each press of a count button to show the running total count for all the categories. Category percentage displays 41–50 are also updated to show the percentages of the category counts relative to the total count. In the example in FIG. 1, 36.7% of all calls resulted in sales. Counting 100% of the data is practical only when the count or population size is relatively small. The data is stored as study "A" by pressing study button 60. "Study A" is indicated on display 54. Multiple studies could be conducted simultaneously by pressing study buttons 60–62 before entering a count. Those studies would be identified on study name displays 63–65 and on help display 54.

Figure 2:
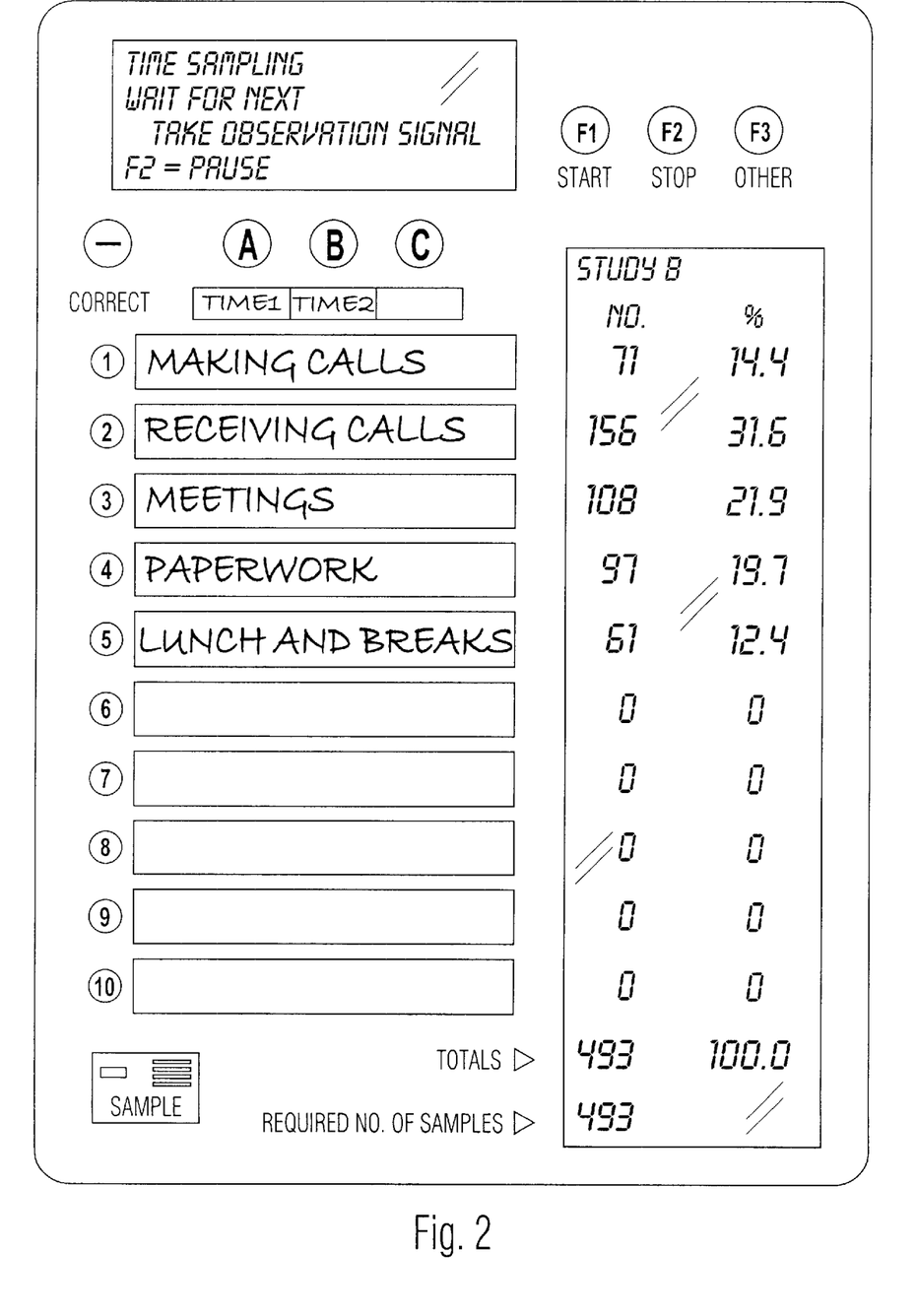
FIG. 2 is a front view thereof while performing time sampling.

FIG. 2:

Entering the results of a telephone call is a simple matter, taking just a few seconds after each call to record the result in a category. Studying how time is being spent is much more complex. For example, if a user wants to see how much time is spent on different activities over a 1-week period, he or she could record a count per minute as to the activity taking place at that moment.

This process would be extremely tedious and timeconsuming. Fortunately, sampling techniques can be used to count a small portion of an entire population—the study period—and provide an estimated result for the entire population with an accuracy that is within a pre-selected range. An exemplar time sampling study shown in FIG. 2 analyzes the amount of time different activities occupy in a work period. Again, the categories are entered on the category name displays, for example, "Making Calls", "Receiving Calls", "Meetings", "Paperwork", and "Lunch and Breaks". The study names are entered on the study display, such as "Time1" and "Time2" for two simultaneous studies on the usage of time. When study button "B" is pressed prior to entering a count, "Study B" is shown on the main display panel.

After starting the program, time sampling is selected when the choice of analysis is presented on the help screen. Instructions are displayed on the help screen to direct the user to enter the sampling parameters (not shown), including an estimated population size, that is, the length of the study period, an estimated category percentage of the most important category, a desired confidence level as a percentage, and the acceptable sampling error as a plus-or-minus percentage to be added and deducted respectively to the category percent. In time sampling, the study period is in time units, such as minutes, hours, days, etc. On the dedicated hardware device, the parameters can be entered using the count buttons as a keypad, wherein the "10" button may be used for zero. The parameters are sequentially requested by the device and entered by the user. Alternatively, a separate keypad may be provided for numeric entry. When the invention is implemented as software running on a programmable computer, the parameters may be entered by keyboard, touch screen, etc.

In time sampling, the aid is arranged to periodically signal the user with the signaling device to make count inputs. The signals are preferably issued at random times for statistical accuracy. The minimum number of signals and therefore minimum samples required is automatically calculated according to conventional statistical formulas based on the parameters entered, and displayed as the number of required samples, which in this example is "493". Whenever the user is alerted with a signal, the count button for the appropriate category should be pressed. For example, if the user is making a phone call when the signal is given, the count button corresponding to "Making Calls" is pressed once. If the user is doing paperwork when another signal is given, the count button corresponding to "Paperwork" is pressed once. Therefore, more counts will accumulate for the activities that occupy more time, and vice versa. The category counts and total count are updated after each press of a count button. Any inputs made in error can be reversed by pressing the correction button. The help display shown in FIG. 2 corresponds to flowchart block 318 in FIG. 6C. After selecting to make a time sampling study and entering the sampling parameters and category names, the user is instructed to wait for the next "take observation" signal. Preferably, the signal will be issued at a random time. At any time while waiting, the user can press function key "F2" to pause the study. This allows the user to check the accuracy of the results thus far and then resume the study or end the study.

The final results are shown in FIG. 2 after the required 493 samples have been taken. During the work week, 14.4% of time was spent making calls, 31.6% of time was spent receiving calls, etc. The results fall within the sampling error at the confidence level previously selected by the user, for example, ±5% sampling error at a 95% confidence level (not shown in the figure).

Figure 3:
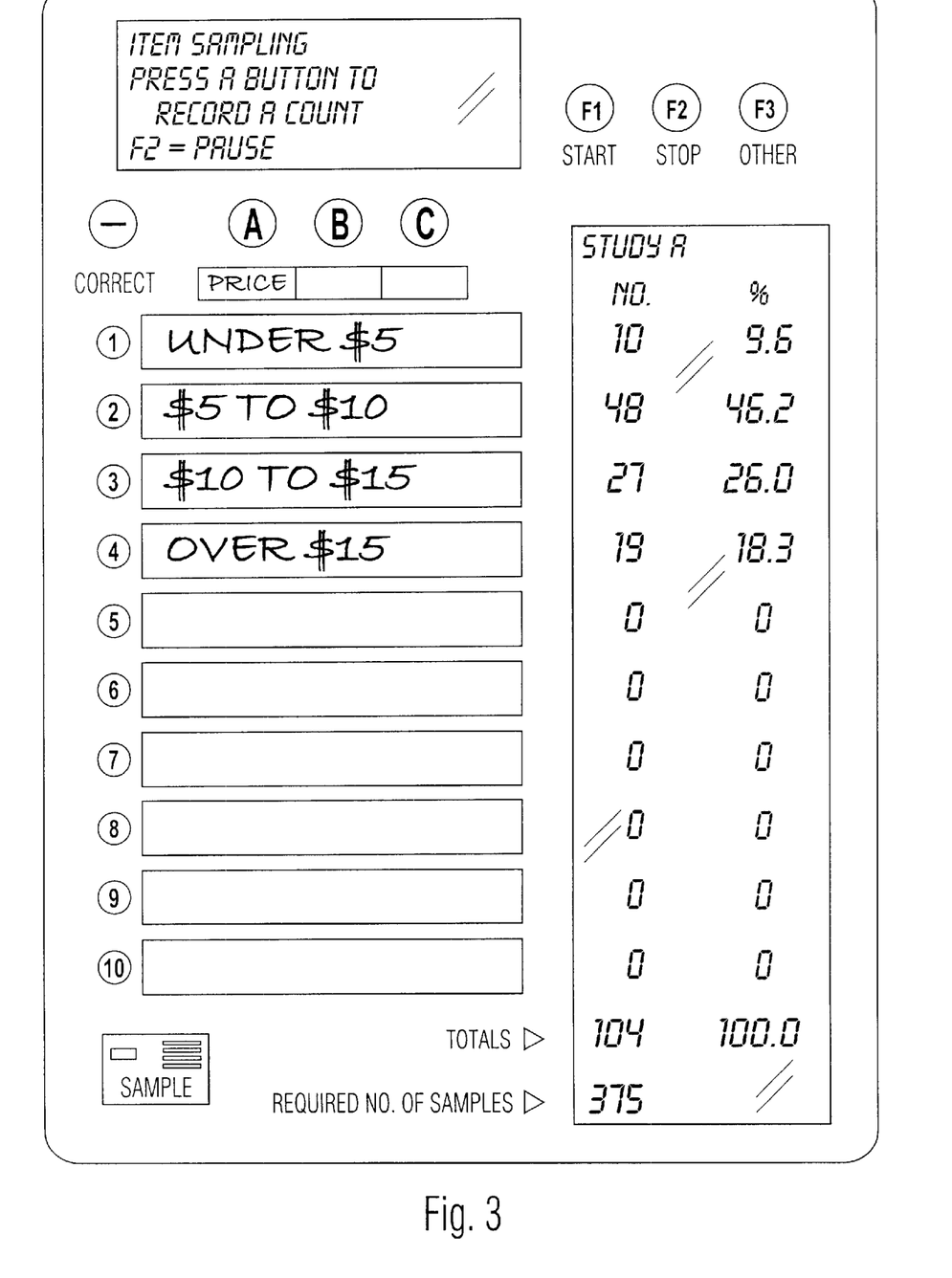
FIG. 3 is a front view thereof while performing item sampling.

FIG. 3:

Counting 100% of the data often cannot be practically done because the number of documents involved is too large. For example, tabulating the number of sales in different price ranges by manually sorting and counting thousands of sales receipts can take a long time. Again, sampling techniques can be used to count a small portion or sample of the entire population—the receipts—and provide an estimated result for the entire population with an accuracy that is within a pre-selected range. An exemplar item sampling study shown in FIG. 3 estimates the actual number of items sold in each price range or category. The categories are entered on the category name displays, for example, "Under $5", "$5 to $10", "$10 to $15", and "Over $15".

After starting the program, item sampling is selected when the choice of analysis (not shown) is presented on the help screen. Instructions (not shown) are displayed on the help screen to direct the user to enter the sampling parameters, including estimated population size, an estimated category percent of the most important category, a desired sampling error as a plus-or-minus percentage, and a desired confidence level as a percentage. In item sampling, the population size is the total number of items from which samples will be drawn at random, such as the number of receipts. On the dedicated hardware device, the parameters can be entered using the count buttons as a keypad, wherein the "10" button may be used for zero. The parameters are sequentially requested by the device and entered by the user. Alternatively, a separate keypad may be provided for numeric entry. When the invention is implemented as software running on a programmable computer, the parameters may be entered by keyboard, touch screen, etc. In item sampling, no sampling signal is given because samples are being drawn at random without regard to how long that takes or the time period of the study.

The minimum number samples required is automatically calculated according to conventional statistical formulas based on the parameters entered, and displayed as the number of required samples, which in this example is "375". The help display shown in FIG. 3 corresponds to flowchart block 415 in FIG. 7B. After selecting to make an item sampling study and entering the sampling parameters and category names, the user is instructed to press a button to record a count by the appropriate category. At any time, the user can press function key "F2" to pause the study. This allows the user to check the accuracy of the results thus far and then resume the study or end the study. The receipts are drawn at random and examined by the user, and the count button for the corresponding price range is pressed for each receipt. For example, the count button labeled as "2" is pressed for a "$6.95" receipt, the count button labeled "1" is pressed for a $4.45 receipt, etc. Any inputs made in error can be reversed by pressing the correction button and then the category key that was pressed in error. The category counts and total count are updated after each press of a count button. As an intermediate result after 104 receipts are counted, 9.6% of the receipts are estimated to be under $5,46.2% are $5 to $10, and so forth. At this point, the accuracy of the intermediate results can be checked by entering additional commands (not shown). However, since the number of samples taken is well below the required sample size, the sample error will be much larger than the desired figure that was entered before the study began. After the required minimum of "375" samples are counted, the final results should fall within the sampling error at the confidence level previously selected, for example, ±5% sampling error at a 95% confidence level (not shown in the figure).

FIGS. 4–7B:

The flowcharts that illustrate the program of the present invention are shown in FIGS. 4–7B. It may be implemented as software for running on a programmable computer, or firmware running in a dedicated hardware device. A complete listing of the source code for the embodiment of the program which is adapted to run on a programmable computer is provided in the appendix. As previously described, commands, category names, sampling parameters, and counts are entered by the user. Instructions, sample sizes, accuracy calculations, and study results are shown on the displays. When the program is implemented as software in a handheld host computer, user inputs are preferably made by stylus taps on screen images or icons. Stylus movements, or their equivalent, may be interpreted by the host's operating system as commands and alphanumeric data. When the program is implemented as firmware in a dedicated hardware device, commands are entered with function keys, category names are written on paper or erasable pads, numeric data are entered using buttons adjacent to the category name displays, and counts are entered with category buttons.

The formulas used in the program to calculate required sample sizes and sampling accuracy are conventional formulas, preferably formulas for sampling with replacement or from a large population, and sampling without replacement from small populations.

Figure 4:
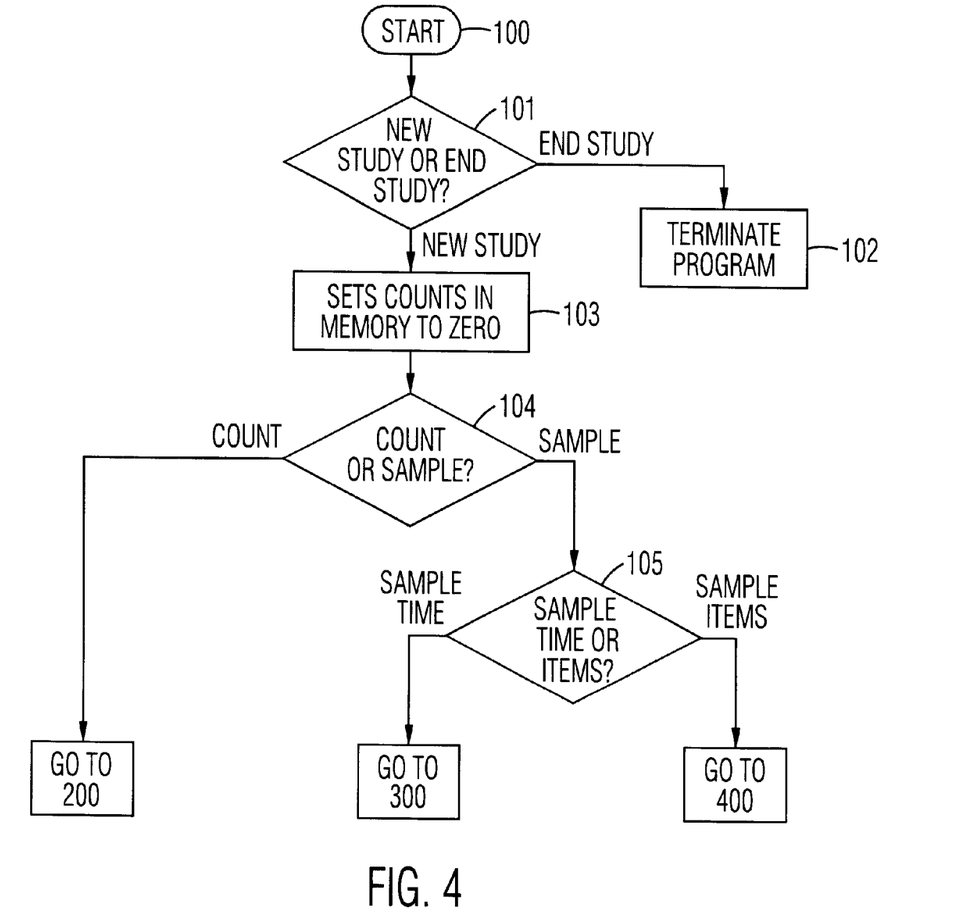
FIG. 4 is a flowchart showing the process for analysis type selection.

The program begins at block 100. At block 101, the user can choose to end an ongoing study or begin a new one. The program branches to block 102 to stop the program if the "End Study" choice is made. An ongoing study can branch to block 101 from elsewhere in the program to enable the user to end a study at any point in the process. Since all data are saved in the storage device, the program can resume where it left off when the host hardware is shut down and then restarted.

A new study begins by removing old data from memory at block 103. The user selects between the counting or sampling type studies at block 104. The choice depends on whether the user wants to count every item in a small population of data, or sample data from a large population. A count choice branches to block 200 where the counting process begins. Counting is used to determine the percentage of items in a category relative to the number of items in all categories. A sample choice branches to block 105 where the user chooses between sampling time and sampling items. Time sampling is used to determine how much time as a percentage is being spent on different activities. Item sampling is used to determine the same things that counting revealed, but in situations where there are too much data to count. For example, it is not practical to count 10,000 sales tickets or call 5,000 customers. Small samples taken from large populations can give results that are accurate enough for decision-making purposes. When time sampling is chosen, the program branches to block 300 where the time sampling process begins. When item sampling is chosen, the program branches to block 400 where the item sampling process begins.

Figure 5:
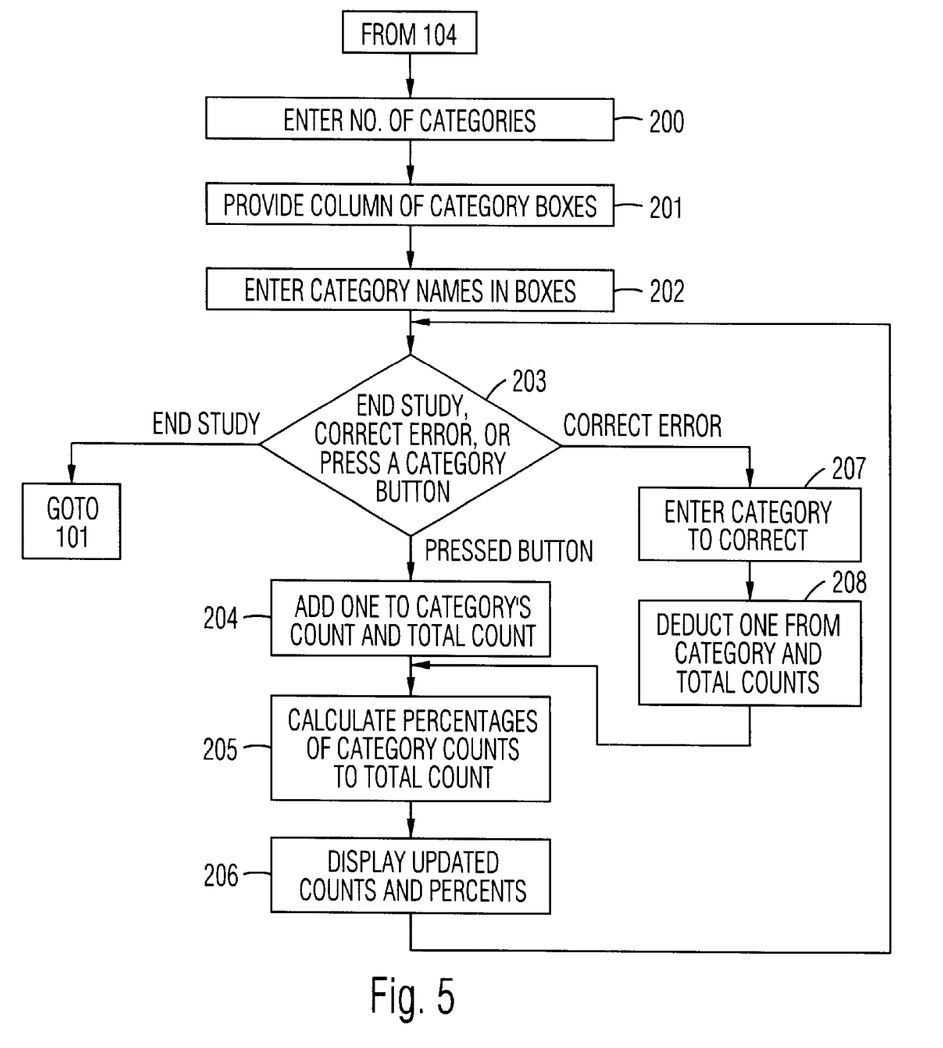
FIG. 5 is a flowchart showing the process for collecting and analyzing count data.

Referring back to the counting process, it begins at block 200 where the number of categories is entered. Since counts are entered by category, the program is preferably told how many category name displays must be shown if the program is running on a programmable computer with a single display screen. An edit routine, not shown, allows the user to correct a wrong entry. The program continues to block 201 where it draws the specified number of category name displays. At block 202, the user enters the category names in the displays. The names can be entered by stylus using the host's interpretation software to covert stylus strokes to characters if the program is running on a PDA. Again, as with all user inputs, the program provides an edit routine, not shown, that allows the user to correct errors, such as a wrong category name or a misspelling. Alternatively, the names can be written with pencil on erasable pads on a dedicated hardware device. At block 203, the program presents the options of "End Study", "Press Count Button", and "Correct Error".

If a count button is pressed for a category, the program continues to block 204 where it increments the cumulative count in memory for the category by one unit. It also adds one unit to the cumulative total count for all categories. The program continues to block 205 where it recalculates the percent of each category's count relative to the total count. At block 206, the display screen is updated with the new category counts and total counts. From there, the program returns to block 203 where it waits for the user's next input.

The "correct error" option at block 203 is selected when the user wants to correct a count input that was made in error. The program branches to block 207 to correct the error by first asking which category should be corrected. The category may be identified by clicking on a category name display or by pushing a count button, depending on the device running the program. The program then continues to block 208 where it deducts one unit from the category count and total count. The program continues to blocks 205 and 206 to update the displays.

The "end study" option at block 203 is selected when the user has finished counting, tabulating the data and recording the results. The program then branches to block 101 where the user can choose to begin a new study or terminate the program.

Figure 6A:
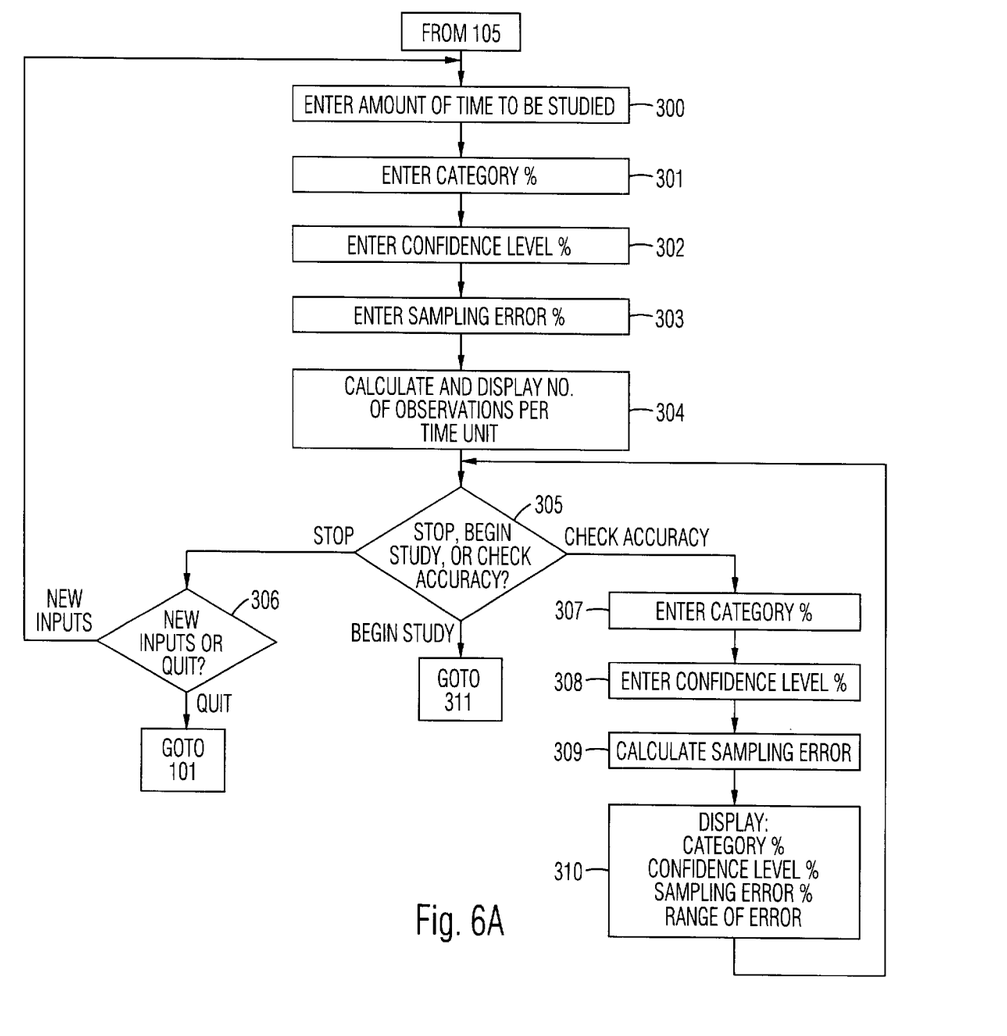
FIG. 6A is a flowchart showing the process for time sampling.

The time sampling process begins at block 300 where the program asks the user to enter the time period to be studied. For example, "40" is entered if the user is studying how much time different activities occupy during a 40 hour work week. (The study may be paused during non-work time.) At block 301, the user enters an estimated percentage that the most important activity category is expected to occupy during the entire study period. For example, 22% can be entered for the estimated percentage of time paperwork occupies in a work week. An estimate is needed to calculate the required sample size for the accuracy desired. After the study, the accuracy of the results is determined from the actual number of observations recorded and the category percentages that were obtained. The user then inputs the desired confidence level percent at block 302. A conventional choice is 95%, but 99.73% may be entered for a higher confidence that the true value will lie within the range of sampling error. The user then enters the acceptable sampling error at block 303. The error is expressed as an absolute ± percent, such as ±3%. At block 304, the program calculates the required number of observations or counts per time unit—an hour in this example—and displays that value on the screen.

At block 305, the user has several choices to make before beginning the study. After seeing how many observations are required, the user may want to try different sampling error inputs that will decrease or increase the required number of observations or counts per hour. Selecting the "Stop" choice advances the program to block 306, where the user can choose "New Inputs" to branch the program back to block 300, or "Quit" to branch the program back to block 101.

At block 305, the user can also check the sampling error for estimated category percentages other than the one entered at block 301. Selecting "Check Accuracy" advances the program to block 307 where the percentage for a different category can be entered. The user may enter the same or a different confidence level percent at block 308. The program calculates the sampling error at block 309 for the new percentage. Unlike the calculations at block 304 where the program determines the sample size for the desired accuracy, the calculations at block 309 work backwards from the sample size to show the expected sample error for other category percentages. The results are shown on the display screen as described at block 310. An example is: Category percentage: 20%; Confidence level: 95%; Sampling error: ±4%; Range of sampling error: 16% to 24%. The program returns to block 305 where the accuracy of other percentages can be checked, the program can be stopped, or the study can proceed.

Figure 6B:
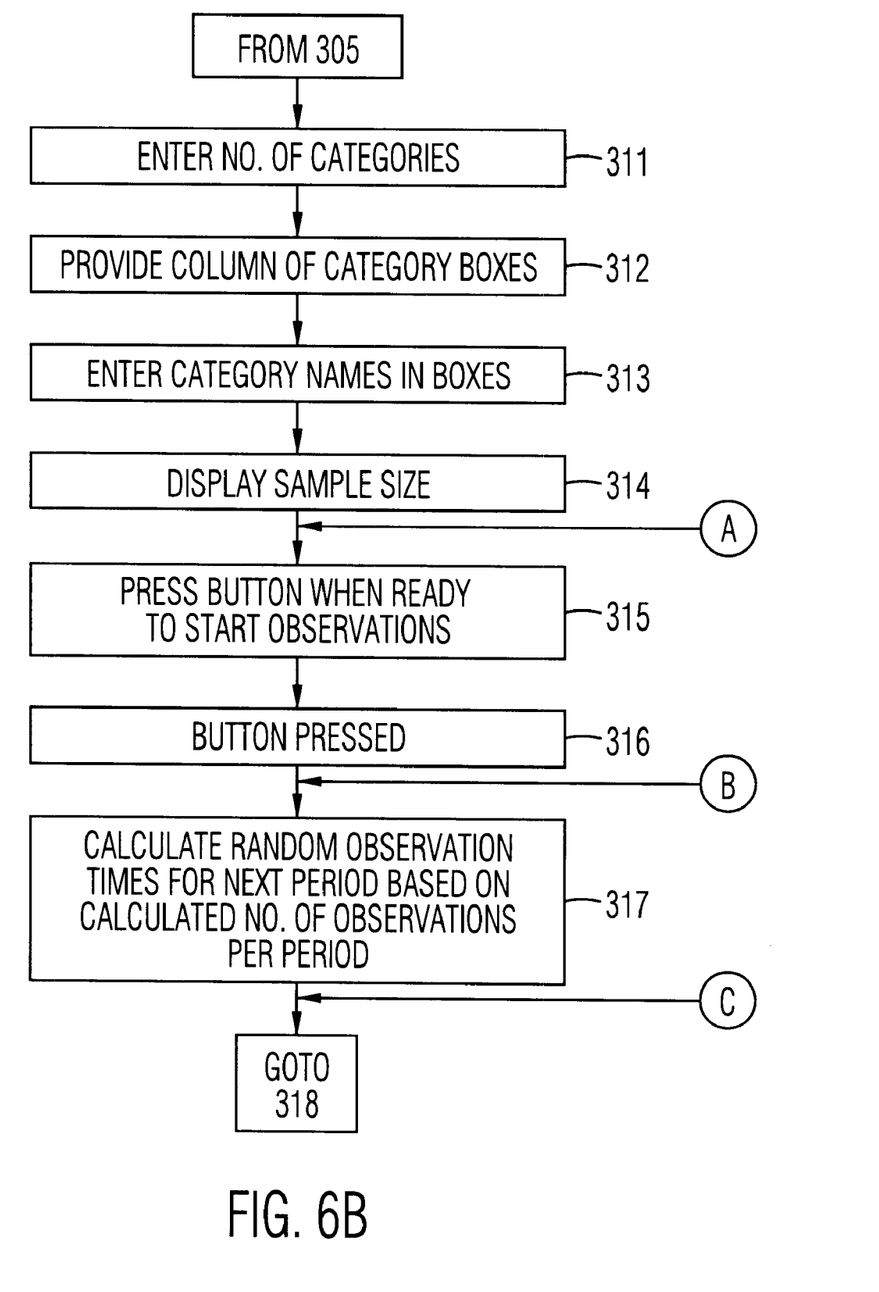
FIG. 6B is a flowchart showing the process for time sampling.

Selecting "begin study" at block 305 advances the program to blocks 311, 312, and 313 where the number of categories are inputted, empty boxes are drawn on the display screen by the program (if the program is running on a programmable computer), and category names are inputted by the user. This process is the same as was described previously for blocks 200, 201 and 202. The program advances to block 314 where it displays the required sample size in terms of the number of observations or counts to be recorded. During the study, the required sample size number serves as a guide for the user to show how far the study has progressed and how much remains. At block 315, the program waits for the user to press a function button to begin the study. When the user pushes a function button at block 316, the time sampling observation process begins at block 317, where the program calculates enough random observation times for a portion of the study period, e.g., one hour, to meet the required number of observations per hour calculated at block 304. Any portion of the study period may be used for calculating the random observation times. The random times are then sorted into a queue of increasing time order.

Figure 6C:
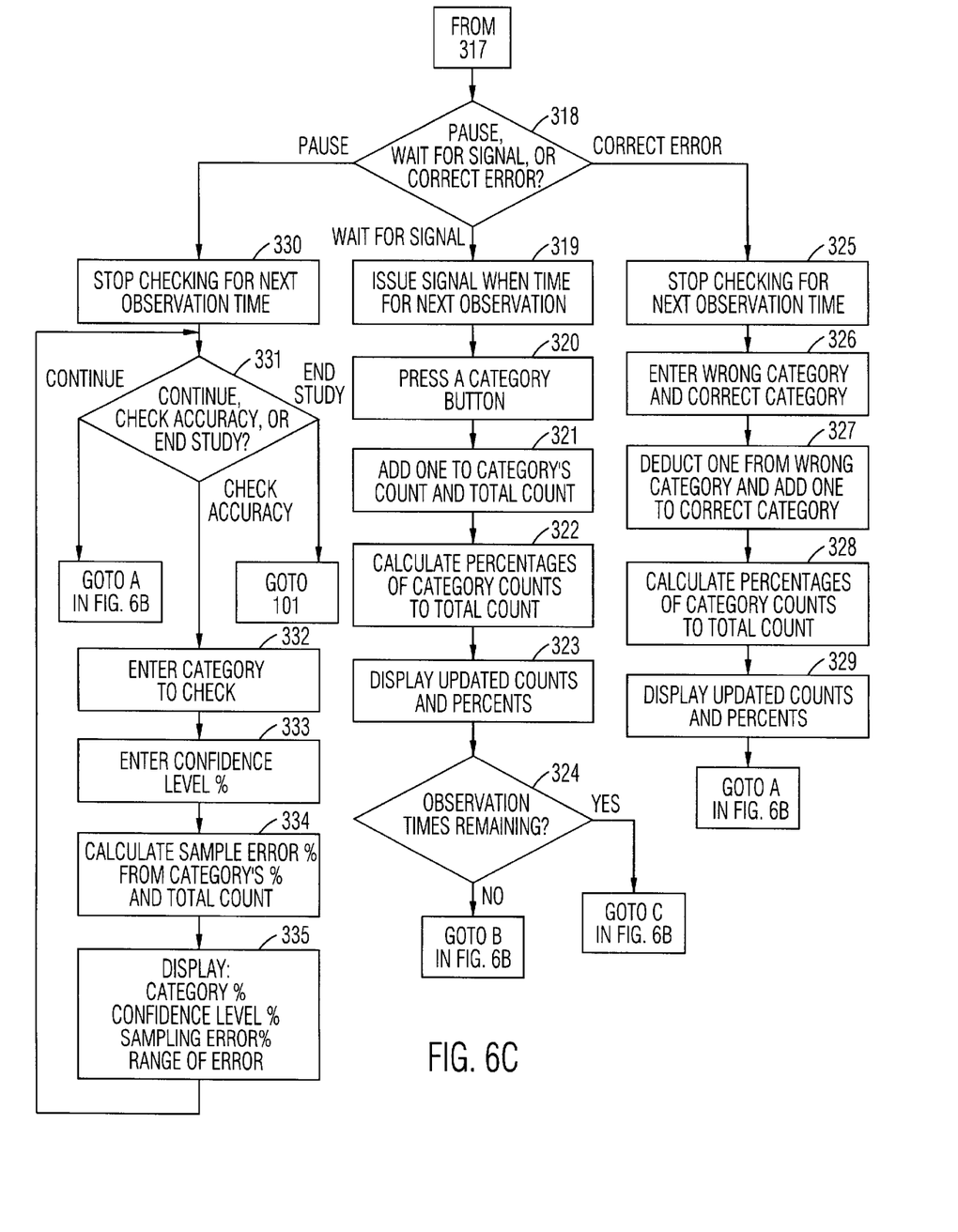
FIG. 6C is a flowchart showing the process for time sampling.

The user waits at block 318 to be notified by a signal to take an observation. While the user is waiting, the program is at block 319, comparing the current clock time to the next randomly generated observation time. When the two times match, the program issues a signal, such as a beep and/or a light to notify the user to enter a count for a category. For example, if the user is making a phone call when the signal is given, the count button for the "Making Call" category is pressed once. For the accuracy calculations to be reliable, the observation times are preferably randomly generated and the observations are preferably made at the moment the signals are given. Blocks 320, 321, 322, and 323 describe the recording of an observation for a category and updating the screen display in the same manner as blocks 203, 204, 205, and 206. The program checks at block 324 if there are still predetermined random times left in the queue waiting to be used. If there are more times, the program branches to block 318 and then to block 319 while the user waits at block 318 for the next observation signal. If no observation times remain at block 324, the program branches to block 317 to generate a batch of random times for the next time period. The program then goes to block 319 to compare clock time against the next new random time, while the user waits at block 318 for the next observation signal.

While the user is waiting for the next signal at block 318, an option is available to correct an observation or count made to the wrong category. A selection branches the program to block 325 where the process of checking for the next observation time is stopped to avoid distracting the user with an observation signal while making the correction. The user identifies the wrong category and the correct category at block 326. The program deducts one observation or count from the wrong category's count and adds one count to the correct category's count at block 327. The counts, percentages and screen display are updated at blocks 328 and 329 as previously described. The program then returns to block 315 where it waits for the user to restart the take-observations process. After a function button push at block 316, the program generates a new batch of observation times at block 317 and continues to block 319 to begin comparing those times while the user waits at block 318.

While the user is waiting for the next signal at block 318, another option available is to pause the take-observations process. This option is chosen to check the current accuracy of the results of a study in process, to check the accuracy after a study is finished and to end the study. The program is preferably arranged to continue to generate take-observation signals even after the required number of samples has been exceeded. Such extended study is useful if time permits and more accuracy is desired. However, if the activities being studied change during the extended study period, this could contaminate the results from the original study period. In this case, "Pause" can be selected at block 318 to branch to blocks 330, 331 and then 101 to end the study.

At block 331, the user can select a "Check Accuracy" option. The user identifies the category to check at block 332 and the desired confidence level percent at block 333. At block 334, the program calculates the ± sample error percent based on the category's current percentage, the current total observations or counts, and the confidence level. The accuracy statistics are displayed on the screen by block 335. The program then returns to block 331 where another category's accuracy can be checked, if desired. When accuracy checking is finished, the user chooses "Continue" at block 331 to restart the take-observations process. The program branches to block 315 where the program waits for the user to push a function button to start the process. At block 331, when enough observations have been recorded, the user chooses "End Study" to branch to block 101 for additional user input on whether the program should be terminated or kept running for a new study.

Figure 7A:
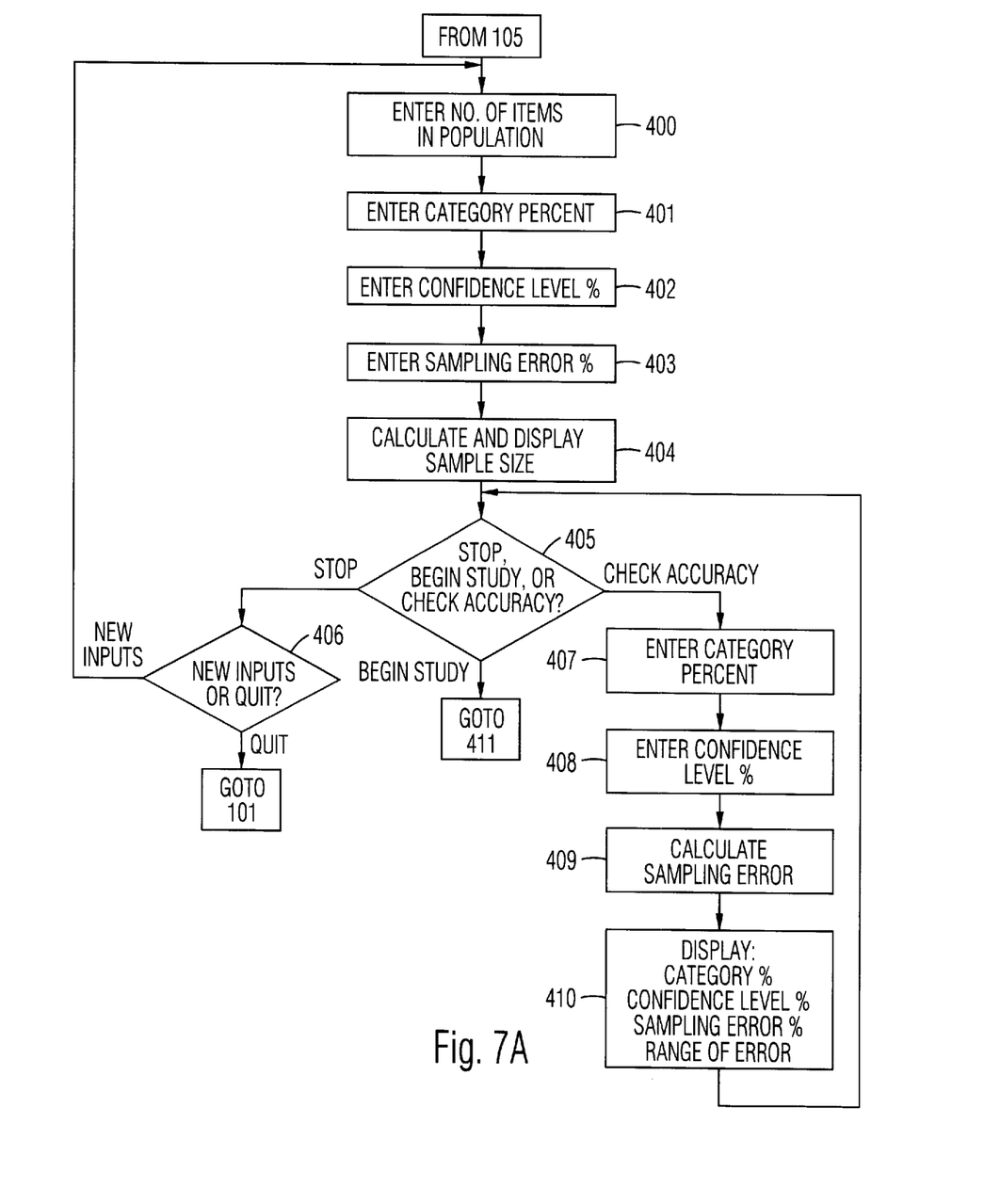
FIG. 7A is a flowchart showing the process for item sampling.

For item sampling, the process begins at block 400 when the user is asked to enter an estimated total population size in units. At blocks 401, 402 and 403, the user enters the estimated percentage value of a particular category, the confidence level percent wanted, and the acceptable sampling error expressed as a ± absolute percentage in the same units as the category percentage. This is the same process as described for blocks 301, 302 and 303 for time sampling. At block 404, the program calculates and displays the required sample size. If the population size entered at block 400 is too small to be sampled for the accuracy desired, an error message, not shown, is displayed. The program advances to block 405 to await further user inputs.

The user choices at block 405 are similar to the choices at block 305 for sampling time. After seeing the required sample size, the user may want to change the inputs. There is always a trade-off with sampling. The larger the sample size, the better the accuracy of the results, but the sampling time and costs are also increased. The parameters can be changed by selecting "Stop" at block 405 and selecting "New Inputs" at block 406, which returns the program to block 400. Alternatively, the user can select "Quit" at block 406 to return to block 101.

At block 405, the user can also check the accuracy in advance for other estimated category percentages. This is done by selecting "Check Accuracy" at block 405 and then proceeding to blocks 407, 408, 409, 410, and returning to block 405 for additional instructions. This is the same process as described previously for blocks 307, 308, 309 and 310 for sampling time.

At block 405, once the user is satisfied with the estimated accuracy and sample size, selecting "Begin Study" starts the sampling study. The program advances to blocks 411, 412 and 413 where the categories are entered and named. This is the same procedure as was described for blocks 200, 201 and 202. At block 414, the program displays the required sample size on the display screen as a reference for tracking sampling progress.

Figure 7B:
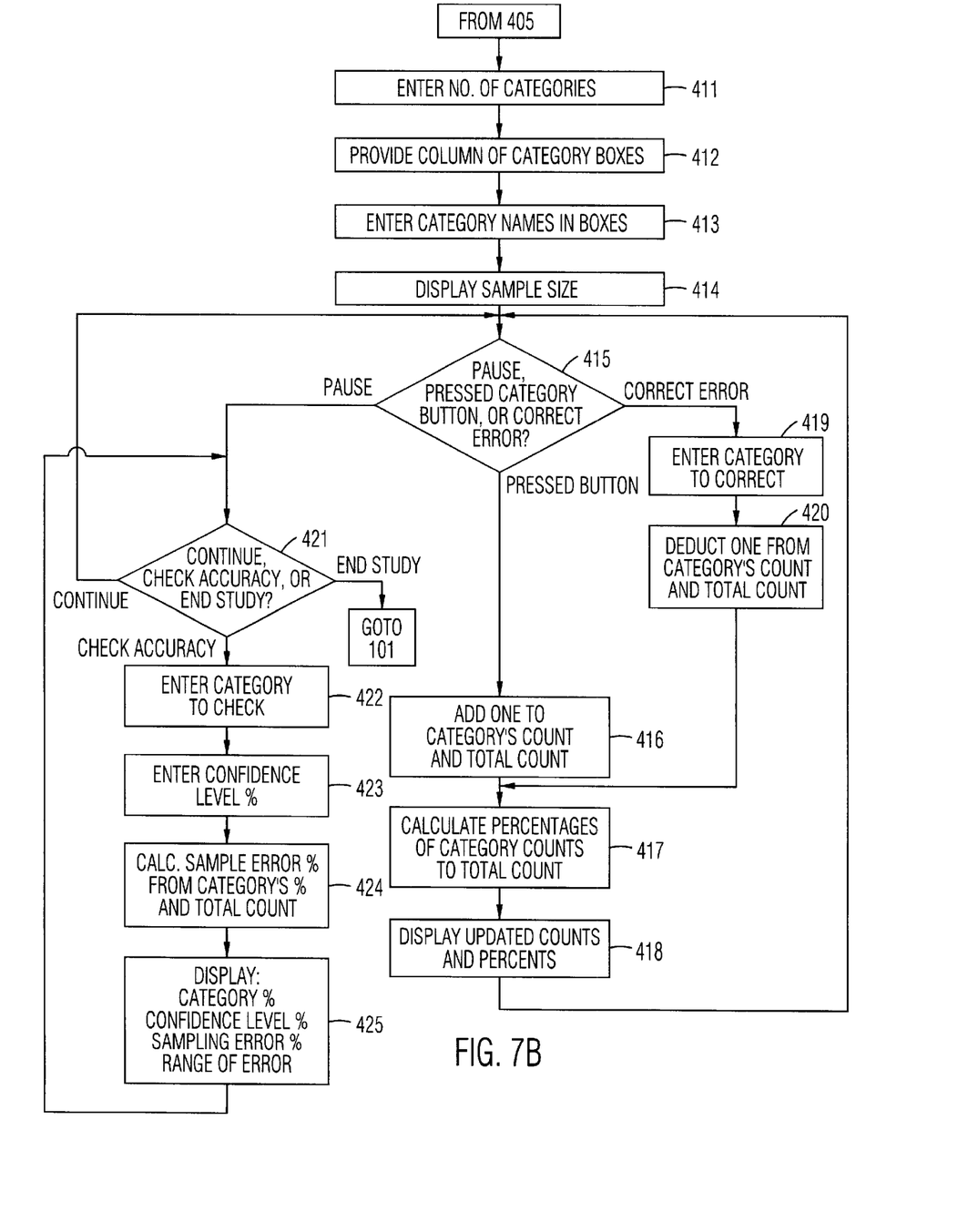
FIG. 7B is a flowchart showing the process for item sampling.

At block 415, the user has three choices just as at block 203 in the counting process. When the user selects "Press A Category Button," the results of drawing each sample at random from the population are entered just like counts were entered. Blocks 416, 417 and 418 refer to the count entry process, the count being a count from a sample in this case, just as described for blocks 204, 205 and 206.

At block 415, when the user chooses "Correct Error," blocks 419 and 420 function as at blocks 207 and 208. At block 415, when the user chooses "Pause," the program advances to block 421 for additional user instructions. If "Check Accuracy" is chosen at block 421, the program advances to blocks 422, 423, 424 and 425 and then returns to block 421. This process is similar to that described for blocks 332, 333, 334 and 335. At block 421, when the user chooses "Continue," the program returns to block 415 to resume sampling and data entry. At block 421, when the user chooses "End Study," the program branches to block 101.

SUMMARY AND SCOPE

Accordingly, the present data collection and analysis aid enables users to easily perform statistical analysis of quantitative data in different categories using different data collection techniques. It performs counting, time sampling, and item sampling. It alerts the user periodically to enter counts when sampling time data. It provides an easily understood and easy to use interface. It preserves entered data and analysis results during shutdown. It also restores stored data and results during startup.

Although the above description is specific, it should not be considered as a limitation on the scope of the invention, but only as an example of the preferred embodiment. Many variations are possible within the teachings of the invention. Therefore, the scope of the invention should be determined by the appended claims and their legal equivalents, not by the examples given.

I claim:

1. A data collection and analysis aid for performing statistical analysis of quantitative data in a plurality of categories, comprising:

category name displays for displaying respective names of said categories;

count buttons respectively corresponding to said category name displays for entering counts in said categories;

category count displays respectively corresponding to said category name displays for respectively displaying cumulative category counts;

a total count display for displaying a total count for all of said categories;

category percentage displays respectively displaying category percentages of said category counts relative to said total count; and a processor arranged to:

respectively show in said category count displays said category counts;

show in said total count display said total count;

respectively show in said category percentage displays said category percentages;

increment each said category counts by one in response to each press of a corresponding count button;

increment said total count by one in response to each press of said corresponding count button; and calculate and update said category percentages in said category percentage displays in response to each press of said corresponding count button;

wherein when said processor is arranged to perform sampling analysis, said processor is arranged to calculate a required sample size based on a user estimated population size, a user estimated category percentage for a selected category, a desired sampling error, and a desired confidence level, said processor is also arranged to display said required sample size in a required sample size display, so as to enable a user to stop sampling when said required sample size is met.

2. A data collection and analysis aid for performing statistical analysis of quantitative data in a plurality of categories, comprising:

category name displays for displaying respective names of said categories;

count buttons respectively corresponding to said category name displays for entering counts in said categories;

category count displays respectively corresponding to said category name displays for respectively displaying cumulative category counts;

a total count display for displaying a total count for all of said categories;

category percentage displays respectively displaying category percentages of said category counts relative to said total count; and a processor arranged to:

respectively show in said category count displays said category counts;

show in said total count display said total count;

respectively show in said category percentage displays said category percentages;

increment each said category counts by one in response to each press of a corresponding count button;

increment said total count by one in response to each press of said corresponding count button; and calculate and update said category percentages in said category percentage displays in response to each press of said corresponding count button;

wherein when said processor is arranged to perform sampling analysis, said processor is arranged to calculate a required sample size based on a user estimated population size, a user estimated category percentage for a selected category, a desired sampling error, and a desired confidence level, said processor is arranged to display said required sample size in a required sample size display, so as to enable a user to stop sampling when said required sample size is met, said processor is also arranged to calculate and display an actual sampling error, and a range of actual sampling error in response to each press of said corresponding count button.

3. A data collection and analysis aid for performing statistical analysis of quantitative data in a plurality of categories, comprising:

category name displays for displaying respective names of said categories;

count buttons respectively corresponding to said category name displays for entering counts in said categories;

category count displays respectively corresponding to said category name displays for respectively displaying cumulative category counts;

a total count display for displaying a total count for all of said categories;

category percentage displays respectively displaying category percentages of said category counts relative to said total count; and a processor arranged to:
respectively show in said category count displays said category counts;
show in said total count display said total count;
respectively show in said category percentage displays said category percentages;
increment each said category counts by one in response to each press of a corresponding count button;
increment said total count by one in response to each press of said corresponding count button;
calculate and update said category percentages in said category percentage displays in response to each press of said corresponding count button; and
study buttons, wherein said processor is arranged to store separate data collection and analysis studies in different locations in a non-volatile storage device in response to the pressing of different study buttons.

4. A method for performing statistical analysis of quantitative data in a plurality of categories, comprising:

providing category name displays for displaying respective names of said categories;

providing count buttons respectively corresponding to said category name displays for entering counts in said categories;

providing category count displays respectively corresponding to said category name displays for respectively displaying cumulative category counts;

providing a total count display displaying a total count for all of said categories;

providing category percentage displays respectively displaying category percentages of said category counts relative to said total count; and incrementing each said category counts by one in response to each press of a corresponding count button;

incrementing said total count by one in response to each press of said corresponding count button;

calculating and updating said category percentages in said category percentage displays in response to each press of said corresponding count button; and calculating a required sample size based on a user estimated population size, a user estimated category percentage for a selected category, a desired sampling error, and a desired confidence level, and displaying said required sample size in a required sample size display for enabling a user to stop sampling when said required sample size is met.

5. A method for performing statistical analysis of quantitative data in a plurality of categories, comprising:

providing category name displays for displaying respective names of said categories;

providing count buttons respectively corresponding to said category name displays for entering counts in said categories;

providing category count displays respectively corresponding to said category name displays for respectively displaying cumulative category counts;

providing a total count display displaying a total count for all of said categories;

providing category percentage displays respectively displaying category percentages of said category counts relative to said total count; and incrementing each said category counts by one in response to each press of a corresponding count button;

incrementing said total count by one in response to each press of said corresponding count button;

calculating and updating said category percentages in said category percentage displays in response to each press of said corresponding count button; and calculating a required sample size based on a user estimated population size, a user estimated category percentage for a selected category, a desired sampling error, and a desired confidence level, displaying said required sample size in a required sample size display for enabling a user to stop sampling when said required sample size is met, and calculating and displaying an actual sampling error, and a range of actual sampling error in response to each press of said corresponding count button.

6. A method for performing statistical analysis of quantitative data in a plurality of categories, comprising:

providing category name displays for displaying respective names of said categories;

providing count buttons respectively corresponding to said category name displays for entering counts in said categories;

providing category count displays respectively corresponding to said category name displays for respectively displaying cumulative category counts;

providing a total count display displaying a total count for all of said categories;

providing category percentage displays respectively displaying category percentages of said category counts relative to said total count; and incrementing each said category counts by one in response to each press of a corresponding count button;

incrementing said total count by one in response to each press of said corresponding count button;

calculating and updating said category percentages in said category percentage displays in response to each press of said corresponding count button; and providing different study buttons, and storing separate data collection and analysis studies in different locations in a non-volatile storage device in response to the pressing of different study buttons.

7. A method for performing statistical analysis of quantitative data in a plurality of categories, comprising:

providing category name displays for displaying respective names of said categories;

providing count buttons respectively corresponding to said category name displays for entering counts in said categories;

providing category count displays respectively corresponding to said category name displays for respectively displaying cumulative category counts;

providing a total count display displaying a total count for all of said categories;

providing category percentage displays respectively displaying category percentages of said category counts relative to said total count; and incrementing each said category counts by one in response to each press of a corresponding count button;

incrementing said total count by one in response to each press of said corresponding count button;

calculating and updating said category percentages in said category percentage displays in response to each press of said corresponding count button; and indicating on a help screen instructions for a user to choose between counting or sampling, and when sampling is chosen, indicating on said help screen instructions for said user to choose between time sampling or item sampling.

* * * * *